United States Patent [19]

Spanoudis

[11] 3,999,601
[45] Dec. 28, 1976

[54] FOOD SERVICE TRAY

[75] Inventor: Louis Spanoudis, Toledo, Ohio

[73] Assignee: Owens-Illinois, Inc., Toledo, Ohio

[22] Filed: Oct. 9, 1975

[21] Appl. No.: 620,973

Related U.S. Application Data

[62] Division of Ser. No. 480,946, June 19, 1974, Pat. No. 3,952,794.

[52] U.S. Cl. .................................. 165/80; 165/169
[51] Int. Cl.² ......................................... F28D 21/00
[58] Field of Search ............................ 165/80, 169

[56] References Cited
UNITED STATES PATENTS 3,780,794  12/1973  Staub ................................. 165/58

*Primary Examiner*—Alan Cohan
*Attorney, Agent, or Firm*—Steve M. McLary; E. J. Holler

[57] ABSTRACT

A food service tray which allows selective heating and/or cooling of meal components carried thereby. A base member of a thermally insulating material has a plurality of compartments divided into serially connected flow chambers having inlet and outlet openings. Food receptacles made of a thermally conductive material carry the meal components and are inserted into the compartments. Thermally insulating lids then cover the food receptacles. A refrigerated fluid under pressure may be passed through all or part of the flow chambers to thereby maintain the contents of the food receptacles therein in a chilled condition. A heated fluid under pressure can then be passed through selected flow chambers to thereby rethermalize or heat the contents of the food receptacles in the heated flow chambers to a proper serving temperature. Simultaneously with the heating of some food receptacles, the flow of refrigerated fluid can be continued to other flow chambers to maintain other meal components in a chilled condition for serving.

3 Claims, 6 Drawing Figures

FOOD SERVICE TRAY

This is a Division, of application Ser. No. 480,946, filed June 19, 1974 now U.S. Pat. No. 3,952,794 issued Apr. 27, 1976.

BACKGROUND OF THE INVENTION

This invention generally relates to food service trays. More specifically, this invention relates to a food service tray carrying various meal components, all of which may be kept chilled until shortly before serving. Most particularly, this invention relates to a food service tray which allows selective rethermalization of certain meal components while other meal components are kept chilled.

The need for a food service system which would allow preparation of meals long before they are needed, hold the meals at a safe temperature, and then reheat portions of the meals for serving has been well recognized. Hospitals in particular need such a system. The prior art shows many attempts to develop such systems. However, these systems all had flaws in either workability or expense. For example, infra-red lamps have been used to reheat portions of meals. Microwaves have also been used for heating selected portions of an entire meal. The so-called "hot pellet" system is also used. In such a system, a large mass of heated material is placed under a tray to keep the contents of the tray warm. However, the heated material could be spilled if the tray were overturned leading to a possible burn hazard. In some cases, a plurality of pre-prepared meals have been transported and stored in totally enclosed, refrigerated carts. In some cases, the service tray or food containers were quite expensive in order to perform specialized heating or cooling function; this required reuse of these components because of economic factors. Ideally, however, all of the food service components should be disposable, with the exception of a transport cart or carrier. I have found that the objectives of good thermal control of meal elements and disposability of the service components can be achieved by forming a base member of an insulating material and providing in the base member compartments divided into two flow chambers. Then, thermally conductive receptacles carrying meal elements are inserted in the compartments and covered with an insulating lid. Chilled air may be circulated through the flow chambers to keep all of the meal elements chilled. If some elements are to be served heated, heated air may be selectively circulated through selected flow chambers to re-heat or keep hot these particular meal elements.

SUMMARY OF THE INVENTION

My invention is a food service tray and a method for using it. A base member of the tray is made of a thermally insulating material and includes a plurality of compartments having upstanding wall portions open at their upper ends. Each compartment has located therein a means for dividing the compartment into two substantially isolated, serially connected flow chambers. There is further provided a fluid inlet opening in one of the flow chambers and a fluid outlet opening in the other flow chamber. A plurality of food receptacles, made of a thermally conductive material, are engaged in the plurality of compartments. The tray is completed by thermally insulated lid means for covering the plurality of food receptacles.

DETAILED DESCRIPTION OF THE DRAWINGS

Figure 1:
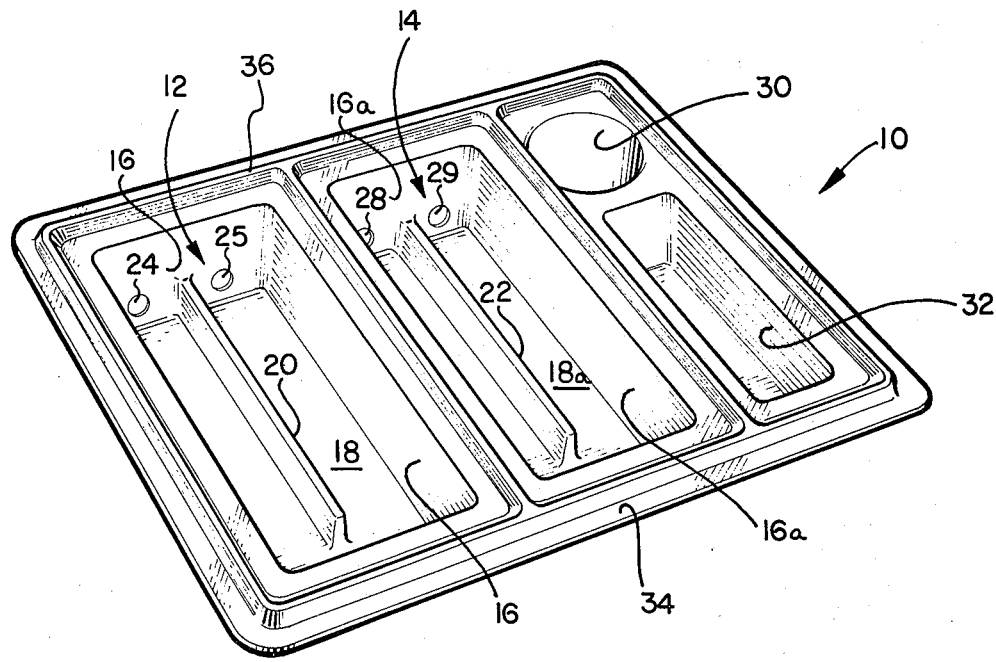
FIG. 1 is a perspective view of the base member of the present invention.

FIG. 1 illustrates a base member 10 which is one component of the food service tray of the present invention. The base member 10 includes compartments generally designated as 12 and 14. The compartments 12 and 14 include upstanding wall portions 16 and 16a respectively which are opened at their upper ends. The compartments 12 and 14 also include bottom portions 18 and 18a which are connected to the wall portions 16 and 16a. A spline portion 20 extends through substantially the entire compartment 12. A similar spline portion 22 extends through substantially the entire compartment 14. An opening 24 is formed completely through one upstanding wall portion 16 of the compartment 12 on one side of the spline 20. A second opening 25 extends completely through the wall portion 16 on the opposite side of the spline 20. Corresponding openings 28 and 29 are similarly formed in the wall portion 16a of the compartment 14. As will be explained later in detail, one of the openings 24 or 25 is a fluid inlet opening and the other of the openings 24 or 25 is a fluid outlet opening. Similarly, the openings 28 and 29 define one fluid inlet opening and one fluid outlet opening. The spline portions 20 and 22 divide the compartments 12 and 14 into two distinct portions. It is obvious from FIG. 1 that spline portions 20 and 22 do not extend upward the entire upward extent of the wall portions 16 and 16a. However, as will be more obvious with respect to FIG. 4, the spline portions 20 and 22 serve to define two substantially isolated flow chambers within the compartments 12 and 14. The base member 10 may also include a depression 30 for a beverage container and a second depression 32 which may be used to contain silverware, napkins or condiments for use with the meal to be served using the food service tray of the present invention. For ease of handling and storage, the base member 10 also includes a flange portion 34 which extends around the entire periphery of the base member 10. In addition, the compartments 12 and 14 may be further defined from the flange portion 34 by an upstanding rib portion 36 which extends around the perimeter of the compartments 12 and 14 and is spaced slightly outwardly from the edge of the compartments 12 and 14. The rib 36 serves, as best seen with respect to FIG. 2, to retain food receptacles that are placed into the compartments 12 and 14. The base member 10 is preferably formed as an integral assembly from a material which has a low thermal conductivity value. That is, the base member 10 should be formed of a material which is a good thermal insulator. A material that has been found particularly effective for this purpose is a polystyrene foam material having a thermal conductivity value of 0.000083 gm cal/cm$^2$ sec° C/cm and which has a thickness of from 1.5 to 4.0 mm. The base member 10 may be formed in any convenient manner, for example thermoformed from sheet material or molded in a steam chest from expandable beads of material.

Figure 2:
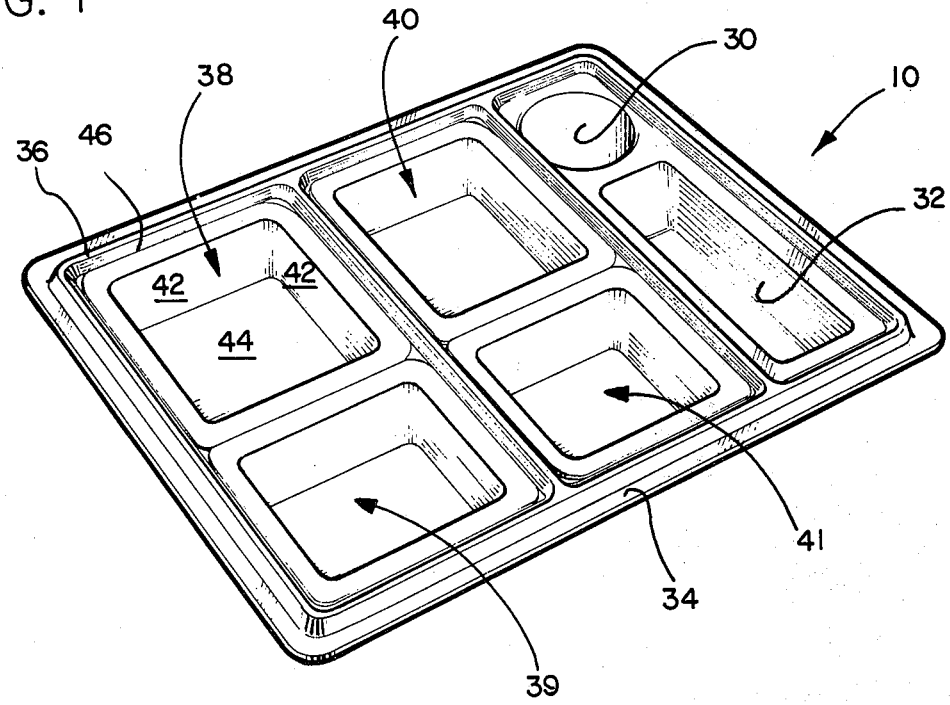
FIG. 2 is a perspective view of the base member of the present invention with food receptacles inserted into the open compartments.

In FIG. 2, a plurality of food receptacles 38, 39, 40 and 41 have been inserted into the compartments 12 and 14. The receptacles 38 and 39 have been placed into the compartment 12 and the receptacles 40 and 41 have been placed into the compartment 14. The food receptacles 38 through 41 are designed to carry the individual constituents of a meal that is to be served. By dividing the constituents of the meal into those components which are to be served heated and those which are to be served in a cooled or chilled condition, it is possible to make use of the division of the compartments 12 and 14 and their separation. The food receptacles 38 through 41 illustrated in FIG. 2 are all substantially identical, and a detailed description of one of these receptacles would serve for all. For example, the food receptacle 38 is made up of upstanding wall portions 42 which are joined to an integral bottom portion 44, and is open at its upper end. In addition, a support flange 46 is connected to the upstanding wall portions 42 at their upper ends and extends outwardly therefrom. The support flange 46 rests on adjacent portions 34 of the flange portion 34 of the base member 10. It is readily apparent in FIG. 2 that the rib 36 is provided to prevent the food receptacles 38 through 41 from shifting in position once they have been inserted into their respective compartments 12 or 14. The rib 36 will engage with the support flange 46 and prevent it from shifting. It should be recognized that while the shape of the food receptacles 38 through 41, as shown in FIG. 2, is of a generally rectangular or square configuration, the precise shape of the food receptacles is not a critical factor in proper operation of the entire food service system. The receptacles may be of any convenient shape, and, in fact, the compartments 12 and 14 could be similarly revised in shape to conform to a desired configuration of a food receptacle. What is required is that any compartment used must contain a means for dividing the compartment into two substantially separated flow chambers that are serially connected. The primary characteristic of the food receptacles 38 through 41 is that they must be made of a material which allows good transfer of heat or a material which has a relatively high thermal diffusivity value. A material that has been found satisfactory is polystyrene having a thermal conductivity value of 0.00019 gm cal/cm$^2$ sec°C/cm and having a thickness of 0.6 mm. or less. Receptacles of the type illustrated and having the required characteristics can be readily produced in a one-piece, seamless configuration from sheet-like polystyrene by conventional thermoforming techniques. Of course, mechanical strength considerations enter into the decision as to the thickness of the material to be used. For example, satisfactory material could be thin gauge aluminum, polypropylene, polyethylene, molded pulp or polysulfone which is formed into the shape of the food receptacle that is desired.

Figure 3:
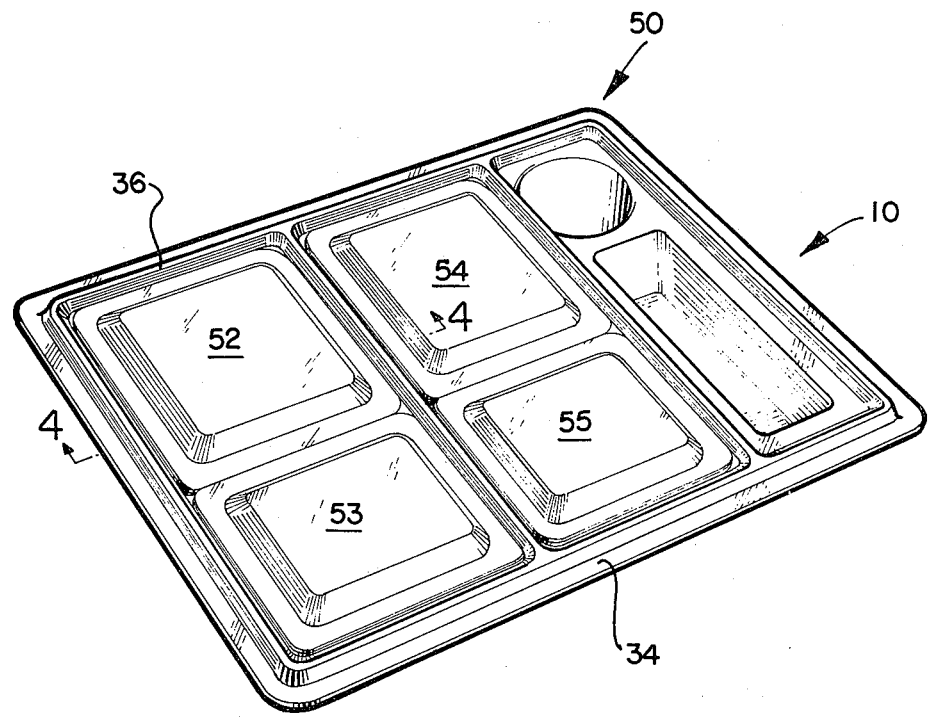
FIG. 3 is a perspective view of the complete food service tray of the present invention.

In FIG. 3, the entire food service tray, generally designated as 50, of the present invention is shown. The food service tray 50 is completed by placing lids 52 through 55 over the food receptacles 38 through 41. The precise configuration of the lids 52 through 55 is not critical but they should be of a dimension such that they will fit over the food receptacles 38 through 41 relatively tightly to insulate the contents of the food receptacles 38 through 41 from the outside atmosphere. In fact, it would be possible to use one elongated lid to replace the lids 52 and 53 and the lids 54 and 55. Again, keep in mind that the precise shape of the food receptacles 38 through 41 may be varied and of course the shape of the lids therefor would also be varied to conform to the specific configuration chosen. The main consideration with respect to the lids 52 through 55 is that they be thermally insulating. The lids 52 through 55 may preferably be made of the same material as that which forms the base 10. In the configuration shown in FIG. 3, a meal could be placed into the food receptacles 38 through 41 and with the lids 52 through 55 in place maintained at the temperature at which the components of the meal were inserted for a reasonable period of time simply because of the thermally insulating properties of the base 10 and the lids 52 through 55. However, this particular food service tray is designed to allow assembly of entire meals a considerable time before the service of a meal is desired and maintain the components of the meal in a cooled and, therefore, preserved condition until a short period prior to the service of the meal. At that time, the hot portions of the meal will be re-thermalized while the portions of the meal to be served chilled will be maintained in their chilled condition.

Figure 4:
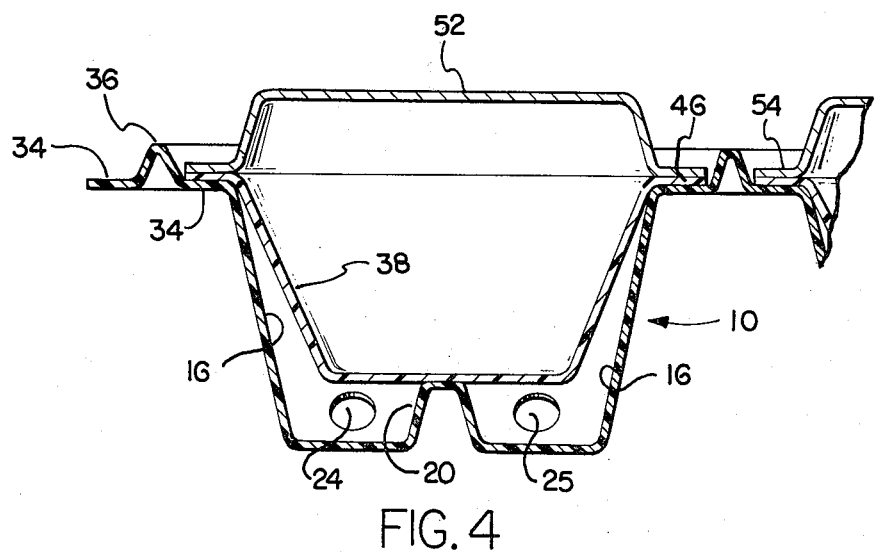
FIG. 4 is a cross-sectional, elevational view taken generally along the line 4—4 in FIG. 3.
Figure 5:
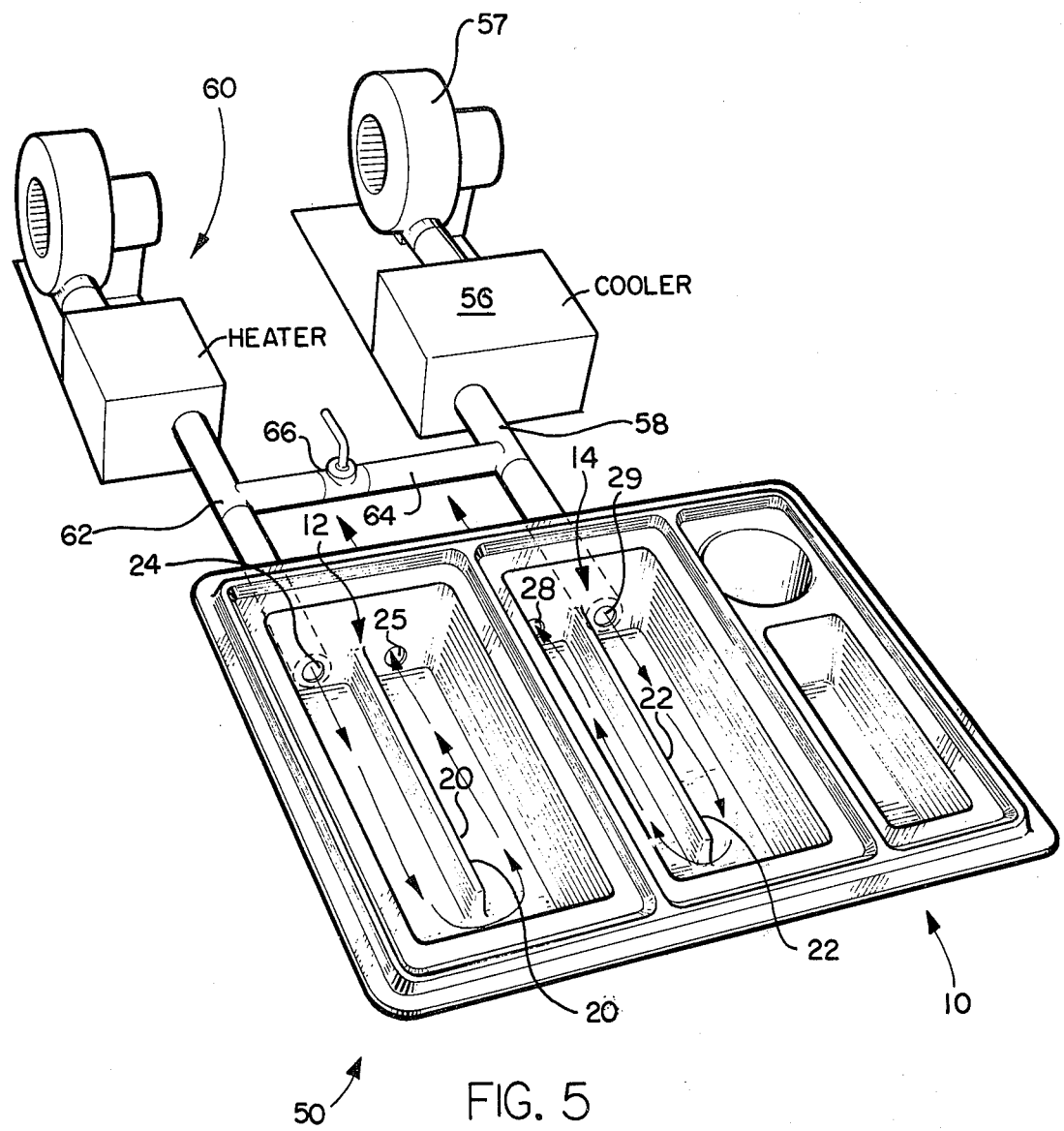
FIG. 5 is a schematic perspective view of a cooling and/or heating system useable with the food service tray of the present invention.

FIGS. 4 and 5 illustrate precisely how this rethermalization combined with storage function may be performed. As particularly seen in FIG. 4, one of the food receptacles, in this case food receptacle 38, is seen to be so proportioned that it is generally in contact with the top of the spline 20. It is not critical that this contact be maintained in all cases, but for most efficient operation of the entire food service tray 50 this is a desirable situation. Note now that with the food receptacle 38 in contact with the spline 20, the openings 24 and 25 do indeed open into two substantially separated compartments or flow chambers defined by the spline 20. The spline 20, as clearly shown in FIG. 1, terminates short of the wall opposite the inlet openings 24 and 25 and thus allows flow of a fluid through the two chambers so defined. FIG. 5 illustrates in a somewhat schematic form precisely how this might be accomplished. Note that in FIG. 5 the food receptacles 38, 39, 40 and 41 and their associated lids 52, 53, 54 and 55 have been omitted for clarity. Of course, these elements would normally be present. First of all, there is a means for supplying a flow of refrigerated fluid under pressure to the tray 50. By way of example, this means may include a refrigeration unit 56 having associated therewith a blower 57. The refrigeration unit 56 is used to chill air which is blown therethrough from the blower 57. Carbon dioxide from dry ice or nitrogen from liquid nitrogen could also be used to supply the chilled fluid. Cool air coming from the refrigeration unit 56 is connected through a pipe 58 to the opening 29 in the compartment 14. In addition, the system also includes a means which is selectably connectable to another one of the openings for supplying a flow of heated fluid under pressure. This means may include a blower and heating element combination 60. Steam could be used as the heated fluid. In addition, combustion gases could also furnish a heated fluid in mobile or field application of this invention. The blower and heater combination 60 will furnish hot air through a pipe 62 to the fluid inlet 24 for the compartment 12. A cross pipe 64 connects the pipe 58 to the pipe 62 through a selectively opened or closed valve 66. With the heater and blower unit 60 turned off and the valve 66 opened, the following action will take place: When the blower 57 is turned on, chilled air will be furnished from the refrigeration unit 56 through the pipe 58 into the compartment 14. This chilled air will flow around the spline 22 and exit to the atmosphere through the opening 28. This flow of chilled air would thereby maintain the food receptacles 40 and 41, normally in the compartment 14 and the contents of the food receptacles 40 and 41 in a chilled state. Similarly, the chilled air will also be transferred through the pipe 64 and the open valve 66 into the pipe 62 which will allow the chilled air to circulate through the compartment 12 around the spline 20 and exiting to the atmosphere through the opening 25. This would similarly keep the food receptacles 38 and 39, which would be in the compartment 12, and their contents in a chilled condition. When it is desired to heat that portion of the meal which is to be served hot, the valve 66 is closed. It must be kept in mind, of course, that in this particular example it is the receptacles 38 and 39 and their contents which are to be rethermalized or heated for serving, but, of course, the system could be connected in a precisely opposite manner and the receptacles 40 and 41 could contain those components of the meal which are to be rethermalized. In this case, of course, the relative positions of the refrigeration unit 56 and the heater and blower unit 60 would have to be reversed. With the valve 66 closed, the heater and blower unit 60 may be turned on. With the heater and blower unit 60 in operation, heated air, or heated fluid, will be conducted into the compartment 12 where it will flow around the spline portion 20 and exit to the atmosphere through the opening 25. This flow of heated air would then heat the food receptacles 38 and 39 and the contents of these food receptacles. Simultaneously with this heating or rethermalizing of that portion of the meal contained in the food receptacles 38 and 39, the flow of chilled air is maintained to the compartment 14 thereby maintaining the food receptacles 40 and 41 and their contents in a chilled or cooled condition. Of course the exhaust of the heated or chilled air to the atmosphere is a relatively wasteful method of operating such a system, and in a large scale commercial system would not be used. In a commercial system, the heated or chilled air would be recirculated through the heating or refrigeration unit and thus such units could be operated at maximum efficiency.

Figure 6:
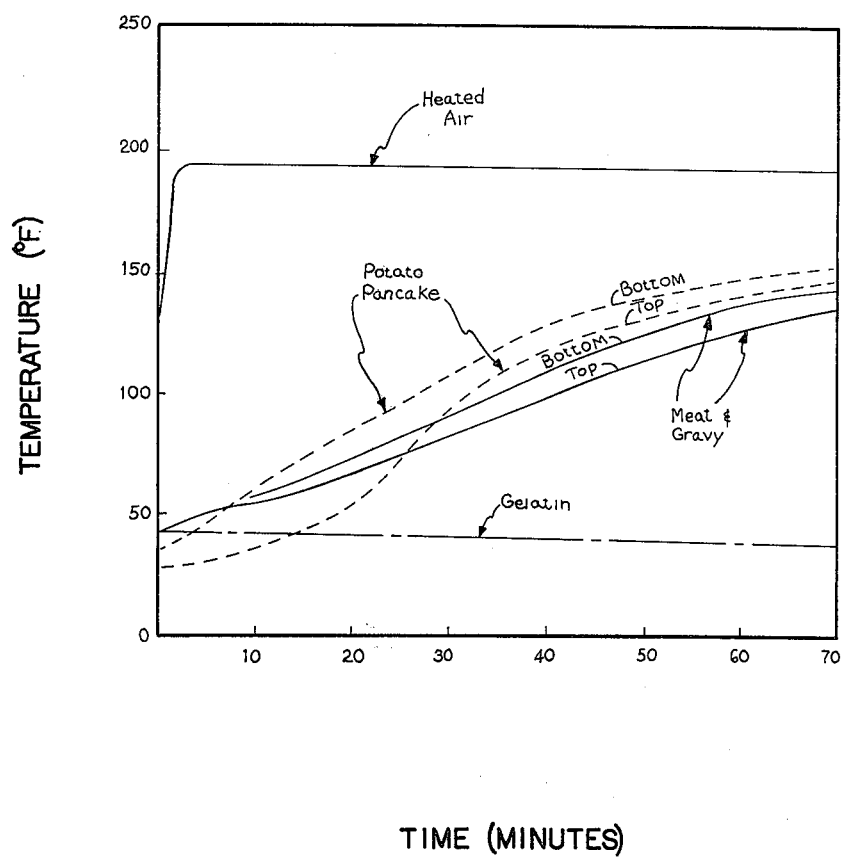
FIG. 6 is a time versus temperature chart illustrating how the food service tray of the present invention allows reheating some meal components while other meal components are retained in a chilled condition.

FIG. 6 is a time versus temperature chart of one specific example of the operation of a food service tray 50 constructed in conformance with the teachings of the present invention. In the particular example given, the food receptacles 38 and 39 respectively contained a beef patty with mushroom gravy and a potato pancake. The food receptacle 40 contained chilled, solidified, flavored gelatin and the food receptacle 41 was empty. At the time designated as zero, all of the components within the food tray 50 were held at a temperature of approximately 45° F. At that time, the valve 66 was closed and the heater and blower unit 60 was activated. As is seen, the temperature of the air from the heater and blower unit 60 rapidly rose to a value of approximately 195° F. This temperature was maintained substantially constant throughout the entire test period. The potato pancake and the meat and gravy had thermocouples inserted at both the bottom and the top of these meal components. As is evident from the graph of FIG. 6, the two components to be served heated rapidly reached a serving temperature of approximately 150° within a period of approximately 70 minutes. The gelatin contained in the food receptacle 40 also had a thermocouple inserted therein. As is also evident from the graph of FIG. 6, the gelatin was maintained at the temperature of 45° F., in fact, even dropping somewhat in temperature to a finishing value of around 40° F. while the components of the food receptacle 38 and 39 were heated to the 150° temperature range. This example illustrates very clearly that chilled or cooled components of a meal may be maintained in this condition while heated components may be raised to serving temperature while these components are separated by a very short distance made up of a thermally insulating material. This experiment was repeated with the air temperature raised to approximately 205° F., and the temperature curves were very similar to those shown in FIG. 6, with the major difference being that the hot food reached minimum serving temperatures in about 50 minutes instead of the 70 minutes as shown in FIG. 6. The gelatin was still maintained in its chilled and solidified condition. It has also been found that the completely frozen meal elements may be heated to serving temperature using the present invention. In this case, the heating time has been found to be about twice the time required to heat meal portions from the 45° F. range to serving temperature.

I claim:
1. A food service tray which comprises, in combination:
   a. a base member made of a thermally insulating material, said base member including a plurality of compartments, having upstanding wall portions, open at their upper sides, each compartment having a means located therein for dividing said compartment into two substantially isolated, serially connected, flow chambers, each compartment further including a fluid inlet opening in one of said flow chambers and a fluid outlet opening in the other one of said flow chambers;
   b. a plurality of food receptacles engaged in said plurality of compartments, said food receptacles being made of a thermally conductive material; and
   c. thermally insulating lid means for covering said plurality of food receptacles.

2. The food service tray of claim 1 wherein said means for dividing said compartments comprises a spline portion extending from one upstanding wall portion toward an opposite upstanding wall portion and terminating short of said opposite upstanding wall portion.

3. The food service tray of claim 2 wherein said spline portions and said food receptacles are relatively proportioned to be in touching relationship when said food receptacles are engaged in said base member.

* * * * *